G. MACLOSKIE.
FLUID PRESSURE GOVERNOR.
APPLICATION FILED AUG. 8, 1908.

953,213.

Patented Mar. 29, 1910.

Witnesses.
George W. Tilden
J. Ellis Glen

Inventor:
George Macloskie,
by Albert G. Davis
Att'y.

UNITED STATES PATENT OFFICE.

GEORGE MACLOSKIE, OF SCHENECTADY, NEW YORK, ASSIGNOR TO GENERAL ELECTRIC COMPANY, A CORPORATION OF NEW YORK.

FLUID-PRESSURE GOVERNOR.

953,213. Specification of Letters Patent. Patented Mar. 29, 1910.

Application filed August 8, 1908. Serial No. 447,514.

*To all whom it may concern:*

Be it known that I, GEORGE MACLOSKIE, a citizen of the United States, residing at Schenectady, county of Schenectady, State of New York, have invented certain new and useful Improvements in Fluid-Pressure Governors, of which the following is a specification.

My invention relates to fluid pressure governors for controlling air compressors, and its object is to provide such a governor which is simple in construction and positive and efficient in operation.

Certain well-known constructions for such governors comprise a movable abutment subjected to reservoir pressure, a valve mechanism controlled by the movable abutment, a member responsive to pressure variations, the pressure on which member is controlled by the valve mechanism, and means controlled by the said member for controlling the pressure in the reservoir by starting and stopping the motor driving the compressor which supplies the reservoir.

One feature of my invention consists in providing means for compensating for leakage past the movable member, and consists in providing the chamber, in which the movable member is placed, with a small port which supplies pressure to the chamber independently of the valve mechanism, and which is arranged to be closed by the member in one of its positions.

Another feature of my invention consists in the connections which I employ between the movable abutment and the valve device controlling the pressure on the movable member. I provide two independently movable valves, both mechanically connected to the abutment with a lost-motion device inserted in the connections, so as to obtain an interval in the movement of the abutment between the movements of the two valves. I further arrange the connections so that they are adjustable to vary this interval.

My invention will best be understood by reference to the accompanying drawing, in which—

Figure 1:
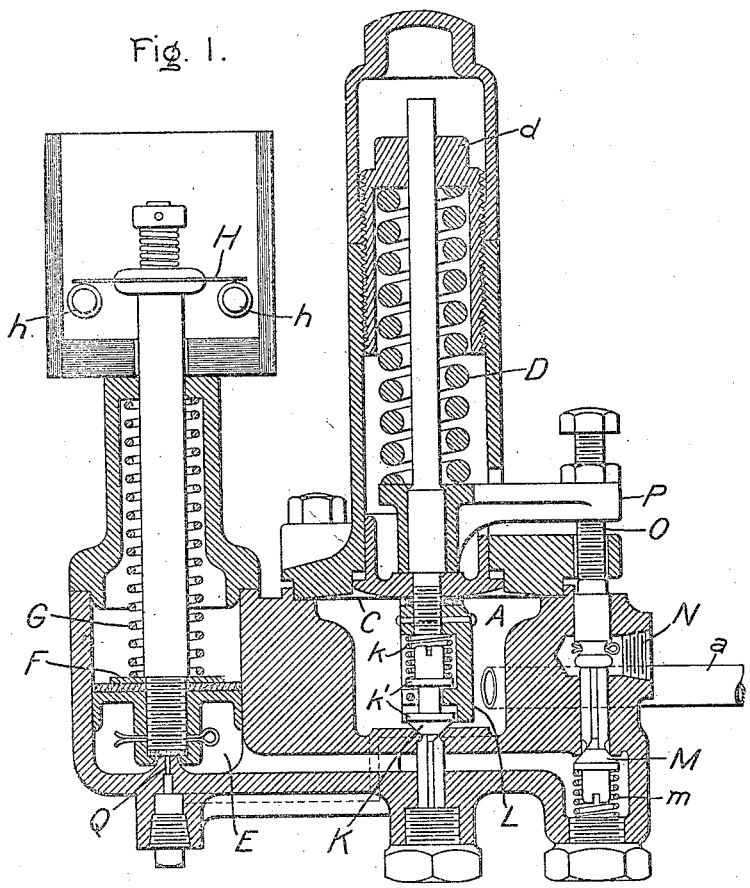
Figure 2:
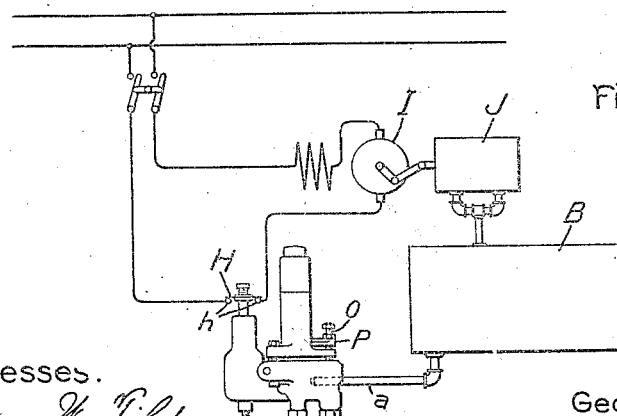

Figure 1 shows a cross-sectional view of a fluid-pressure governor arranged in accordance with my invention, and Fig. 2 is a diagram of the connections of the governor to reservoir and to the compressor motor.

In Fig. 1, A represents a chamber which is connected through a pipe $a$ to the reservoir B (see Fig. 2). C represents a diaphragm in the chamber A, which is subjected to reservoir pressure. The reservoir pressure on the diaphragm C is opposed by a compression spring D. The pressure of this spring is adjustable by means of a nut $d$. E represents a second chamber in which is a piston F, responsive to variations of pressure in the chamber E. A spring G presses piston F downward, and, as long as there is no pressure in chamber E, holds the piston in the position shown. H represents a contact member carried by the spindle of piston F arranged to bridge the contacts $h$ when piston F is in the position shown. These contacts $h$ control the motor I driving the compressor J, which supplies the reservoir B (see Fig. 2). K represents a puppet valve which is normally held seated by a light spring $k$, but which, when raised, connects chamber A and chamber E, thereby subjecting piston F to reservoir pressure. The valve K is actuated through a lost-motion connection by the diaphragm C. This lost-motion connection comprises a member L secured to the diaphragm C and arranged to engage one or the other of two collars $k^1$ on the spindle of valve K. M represents a second puppet valve, which is normally pressed upward against its seat by a light spring $m$. When valve M is opened, it connects chamber E to atmosphere through port N, thereby removing the pressure from the lower side of piston F. With the diaphragm C in the position shown, valve M is closed, but is opened upon a downward movement of the diaphragm by a plunger O, which is carried by an arm P secured to the abutment. The plunger O is screw-threaded, so that its position, with respect to arm P, and consequently to diaphragm C, is adjustable. Q represents a small port opening into chamber E, and connected independently of the valves to chamber A, so that when port Q is opened, reservoir pressure is supplied through it to chamber E. When piston F is in the position shown, port Q is closed, but when the piston is raised by the admission of pressure into chamber E, port Q, serves to supply sufficient air to compensate for leakage past the piston.

In the position of the parts shown in Fig. 1, piston F is at its lowest position, closing port Q and also closing the motor circuit through contact member H. The motor, consequently drives the compressor, raising the pressure in the reservoir. As this pressure increases, diaphragm C is moved upward against the pressure of spring D, until the member L engages the upper collar $k^x$ on the spindle of valve K. Air is then admitted from reservoir through pipe $a$ and chamber A to chamber E. This pressure causes piston F to rise quickly, breaking the motor circuit. As long as the desired pressure is maintained in the reservoir, piston F remains raised, then, when the pressure in the reservoir falls, the diaphragm C moves gradually downward, first permitting valve K to be closed by the spring $k$. Leakage past piston F is then compensated for by flow of air through the restricted port Q. A further downward movement of the diaphragm C, which is permitted by the lost-motion connection between the diaphragm and the valve K, brings plunger O into engagement with the valve M, and forces it down from its seat. This connects chamber E to atmosphere through port N. The pressure, therefore, rapidly falls in chamber E, since port Q is too small to maintain the pressure. Piston F, therefore, moves back to the position shown in Fig. 1, closing port Q and starting the compressor motor. As the pressure again increases, valve M is first allowed to close and then the continued upward movement of the diaphragm C again opens the valve K, and the cycle of operation is repeated, as above stated.

The adjustment of the governor for different pressures is obtained by adjustment of the nut $d$, which varies the amount of reservoir pressure required to move the diaphragm C, and the adjustment for different ranges, that is, differences between the pressures at which the motor is started and stopped, is obtained by adjusting the position of plunger O with respect to the arm P.

I do not desire to limit myself to the particular construction and arrangement of parts here shown, but aim in the appended claims to cover all modifications which are within the scope of my invention.

What I claim as new and desire to secure by Letters Patent of the United States, is,—

1. In combination with a reservoir, a fluid pressure governor comprising a movable abutment subjected to a pressure corresponding to the pressure in said reservoir, means for opposing said pressure on said abutment, a chamber, a movable member therein responsive to fluid pressure, a valve device controlled by said abutment controlling the pressure in said chamber, said chamber being provided with a restricted port connected to a source of pressure independently of said valve device and arranged to be closed by said member in one position thereof, and means controlled by said member for controlling the pressure in said reservoir.

2. In combination with a reservoir, a fluid pressure governor comprising a movable abutment subjected to a pressure corresponding to the pressure in said reservoir, means for opposing said pressure on said abutment, a chamber, a movable member therein responsive to fluid pressure, a valve device controlled by said abutment for connecting said chamber alternately to reservoir and to atmosphere, said chamber having a restricted port connecting it to reservoir independently of said valve device and arranged to be closed by said member when said chamber is connected to atmosphere, and means controlled by said member for controlling the pressure in said reservoir.

3. In combination with a reservoir, a fluid pressure governor comprising a movable abutment subjected to a pressure corresponding to the pressure in said reservoir, means for opposing said pressure on said abutment, a chamber having a restricted port connected directly to said reservoir, a movable member therein responsive to fluid pressure, a pair of independently movable valves arranged respectively to raise and lower the pressure in said chamber, mechanical connections between both valves and said abutment, said connections including a lost-motion device, and means controlled by said member for controlling the pressure in said reservoir.

4. In combination with a reservoir, a fluid pressure governor comprising a movable abutment subjected to a pressure corresponding to the pressure in said reservoir, means for opposing said pressure on said abutment, a chamber having a restricted port connected directly to said reservoir, a movable member therein responsive to fluid pressure, a pair of independently movable valves arranged respectively to raise and lower the pressure in said chamber, mechanical connections between both valves and said abutment, said connections including a lost-motion device and being adjustable to vary the point in the movement of said abutment at which one of said valves is actuated, and means controlled by said member for controlling the pressure in said reservoir.

5. In combination with a reservoir, a fluid pressure governor comprising a movable abutment subjected to a pressure corresponding to the pressure in said reservoir, means for opposing said pressure on said abutment, a chamber having a restricted port connected directly to said reservoir, a movable member therein responsive to fluid pressure, a pair of independently movable valves arranged respectively to raise and lower the pressure in said chamber, mechanical connections between both valves and said abutment, said connections including a lost-motion device, and being adjustable to vary the point in the movement of said abutment at which one of said valves is actuated, means for adjusting the opposing pressure on said abutment to vary the amount of reservoir pressure required to move said abutment, and means controlled by said member for controlling the pressure in said reservoir.

6. In combination with a reservoir, a fluid pressure governor comprising a movable abutment subjected to a pressure corresponding to the pressure in said reservoir, means for opposing said pressure on said abutment, a chamber having a restricted port connected directly to said reservoir, a movable member therein responsive to fluid pressure, a pair of independently movable valves arranged respectively to raise and lower the pressure in said chamber, mechanical connections between one of said valves and said abutment including a lost-motion device, a plunger actuated by said abutment and adapted to engage and move the other valve, said plunger being adjustable in position with respect to said abutment, and means controlled by said member for controlling the pressure in said reservoir.

In witness whereof, I have hereunto set my hand this 6th day of August, 1908.

GEORGE MACLOSKIE.

Witnesses:
BENJAMIN B. HULL,
HELEN ORFORD.